United States Patent
Semsarzadeh et al.

(10) Patent No.: US 11,706,415 B2
(45) Date of Patent: Jul. 18, 2023

(54) STILL FRAME DETECTION IN VIDEO DATA

(71) Applicants: ADVANCED MICRO DEVICES, INC., Santa Clara, CA (US); ATI TECHNOLOGIES ULC, Markham (CA)

(72) Inventors: Mehdi Semsarzadeh, Markham (CA); Jiao Wang, Markham (CA); Yao Wen Yu, Markham (CA); Edward Harold, Markham (CA); Richard E. George, Santa Clara, CA (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/134,948

(22) Filed: Dec. 28, 2020

(65) Prior Publication Data
US 2022/0210415 A1 Jun. 30, 2022

(51) Int. Cl.
*H04N 19/124* (2014.01)
*H04N 19/132* (2014.01)
*H04N 19/176* (2014.01)

(52) U.S. Cl.
CPC ......... *H04N 19/124* (2014.11); *H04N 19/132* (2014.11); *H04N 19/176* (2014.11)

(58) Field of Classification Search
CPC ... H04N 19/124; H04N 19/132; H04N 19/176
See application file for complete search history.

(56) References Cited

U.S. PATENT DOCUMENTS

| | | | |
|---|---|---|---|
| 9,351,004 B2 | 5/2016 | Cherif et al. | |
| 10,855,988 B2 | 12/2020 | Jin et al. | |
| 2001/0001614 A1* | 5/2001 | Boice | H04N 19/124 |
| | | | 375/E7.176 |
| 2008/0075168 A1* | 3/2008 | Toma | H04N 19/132 |
| | | | 375/E7.22 |
| 2009/0022218 A1* | 1/2009 | Kim | H04N 19/70 |
| | | | 375/240.03 |
| 2014/0241421 A1* | 8/2014 | Orton-Jay | H04N 19/436 |
| | | | 375/240.03 |
| 2016/0134865 A1* | 5/2016 | Amer | H04N 19/176 |
| | | | 375/240.02 |
| 2019/0014319 A1* | 1/2019 | Jannard | H04N 19/124 |

FOREIGN PATENT DOCUMENTS

| | | | | |
|---|---|---|---|---|
| EP | 1345450 A2 * | 9/2003 | .......... | H04N 19/105 |
| EP | 1345450 A2 | 9/2003 | | |
| WO | WO-2007013183 A1 * | 2/2007 | .......... | H04N 17/004 |

OTHER PUBLICATIONS

International Search Report and Written Opinion, PCT/US2021/064759, dated May 9, 2022, 12 pages.

* cited by examiner

*Primary Examiner* — Hesham K Abouzahra

(57) ABSTRACT

Still frame detection for single pass video data, including: determining that an average quantization parameter of a frame of video data falls below a quantization parameter threshold; determining whether an amount of skipped macroblocks in the frame meets a skipped macroblock threshold; and responsive to the amount of skipped macroblocks exceeding the skipped macroblock threshold, identifying the frame as a still frame.

20 Claims, 7 Drawing Sheets

STILL FRAME DETECTION IN VIDEO DATA

BACKGROUND

When two or more consecutive frames have identical or very similar content, such frames are referred to as still frames, still images, or static scenes. Where the still frames are encoded referencing other frames, the still frames require fewer bits to encode, and will generally not use the entirety of the bits allocated for their encoding. The accumulated bits may result in a reduced quantization parameter for encoding, thereby increasing the size of encoded still frames, over the time, while not producing a visibly perceptible increase in quality.

DETAILED DESCRIPTION

Figure 1:
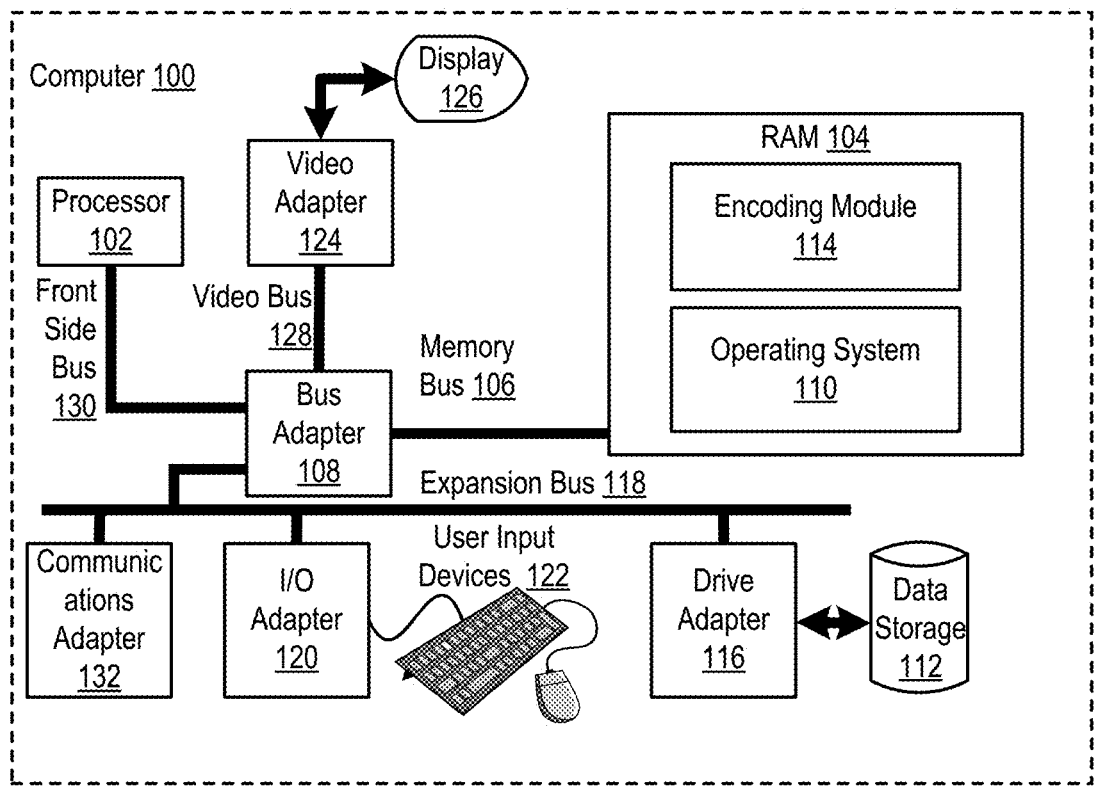
FIG. 1 is a block diagram of an example computer for still frame detection in video data according to some embodiments.

In some embodiments, a method of still frame detection in video data includes: determining that an average quantization parameter of a frame of video data falls below a quantization parameter threshold; determining whether an amount of skipped macroblocks in the frame meets a skipped macroblock threshold; and responsive to the amount of skipped macroblocks exceeding the skipped macroblock threshold, identifying the frame as a still frame.

In some embodiments, the method further includes: responsive to the amount of skipped macroblocks falling below the skipped macroblock threshold, determining that an amount of interframe-encoded macroblocks of the frame meets an interframe macroblock threshold; determining that a rate-distortion cost ratio of skipped macroblocks of the frame relative to non-skipped macroblocks of the frame falls below a rate-distortion cost ratio threshold; and responsive to the rate-distortion cost ratio falling below the rate-distortion cost ratio threshold, identifying the frame as the still frame. In some embodiments, the method further includes: modifying, in response to the frame being identified as the still frame, one or more encoding attributes for a next frame; and encoding the next frame according to the one or more modified encoding attributes. In some embodiments, the method further includes generating data indicating the frame as the still frame. In some embodiments, the method further includes skipping, based on the data, one or more identified still frames during an analysis of the video data. In some embodiments, the video data includes single pass video data. In some embodiments, the average quantization parameter includes an average of each quantization parameter used to encode each macroblock of the frame.

In some embodiments, an apparatus for still frame detection in video data performs steps including: determining that an average quantization parameter of a frame of video data falls below a quantization parameter threshold; determining whether an amount of skipped macroblocks in the frame meets a skipped macroblock threshold; and responsive to the amount of skipped macroblocks exceeding the skipped macroblock threshold, identifying the frame as a still frame.

In some embodiments, the steps further include: responsive to the amount of skipped macroblocks falling below the skipped macroblock threshold, determining that an amount of interframe-encoded macroblocks of the frame meets an interframe macroblock threshold; determining that a rate-distortion cost ratio of skipped macroblocks of the frame relative to non-skipped macroblocks of the frame falls below a rate-distortion cost ratio threshold; and responsive to the rate-distortion cost ratio falling below the rate-distortion cost ratio threshold, identifying the frame as the still frame. In some embodiments, the steps further include: modifying, in response to the frame being identified as the still frame, one or more encoding attributes for a next frame; and encoding the next frame according to the one or more modified encoding attributes. In some embodiments, the steps further include generating data indicating the frame as the still frame. In some embodiments, the steps further include skipping, based on the data, one or more identified still frames during an analysis of the video data. In some embodiments, the video data includes single pass video data. In some embodiments, the average quantization parameter includes an average of each quantization parameter used to encode each macroblock of the frame.

In some embodiments, a computer program product disposed upon a non-transitory computer readable medium includes computer program instructions for still frame detection in video data that, when executed, cause a computer system to perform steps including: determining that an average quantization parameter of a frame of video data falls below a quantization parameter threshold; determining whether an amount of skipped macroblocks in the frame meets a skipped macroblock threshold; and responsive to the amount of skipped macroblocks exceeding the skipped macroblock threshold, identifying the frame as a still frame.

In some embodiments, the steps further include: responsive to the amount of skipped macroblocks falling below the skipped macroblock threshold, determining that an amount of interframe-encoded macroblocks of the frame meets an interframe macroblock threshold; determining that a rate-distortion cost ratio of skipped macroblocks of the frame relative to non-skipped macroblocks of the frame falls below a rate-distortion cost ratio threshold; and responsive to the rate-distortion cost ratio falling below the rate-distortion cost ratio threshold, identifying the frame as the still frame. In some embodiments, the steps further include: modifying, in response to the frame being identified as the still frame, one or more encoding attributes for a next frame; and encoding the next frame according to the one or more modified encoding attributes. In some embodiments, the steps further include generating data indicating the frame as the still frame. In some embodiments, the steps further include skipping, based on the data, one or more identified still frames during an analysis of the video data. In some embodiments, the video data includes single pass video data.

In video encoding, especially in single pass video encoding, a rate control algorithm allocates an amount of bits for encoding each frame. For example, the rate control algorithm will allocate bits for frames based on a target bitrate for the video data as a whole. The rate control algorithm then determines a quantization parameter (QP) for encoding the frame or for each block of the frame based on the allocated bits. The quantization parameter is a parameter defining a degree of quantization to be applied when encoding a frame (e.g., on a per-frame basis, on a per-block basis). Accordingly, a higher quantization parameter indicates that a higher degree of quantization will be applied, resulting in increased compression, reduced quality, and reduced file size.

When two or more consecutive frames have identical or very similar content, such frames are referred to as still frames, still images, or static scenes. For example, video of a scene where there is no human activity will have identical content in most parts. Where several consecutive still frames are encoded in the video data, the still frames may be encoded as interframes referencing other frames. Accordingly, the still frames require fewer bits to encode, and will generally not use the entirety of the bits allocated for their encoding. In existing solutions, especially for single pass video encoding, this causes the rate control algorithm to reduce the QP so that more of the allocated bits are used. The resulting encoded still frames will then have high Peak Signal to Noise Ratios (PSNRs). When a period of still frames has ended and frames with more motion are encoded, the rate control algorithm will encode these frames with the smaller QP as the encoder does not know that the period of still frames has ended. By using a low QP on frames with motion, the encoder will run out of allocated bits quickly, triggering an increased QP for subsequently encoded macroblocks in the frame in order to keep the bit usage close to target. This can result in various perceptible quality differences, such as a frame with a high quality upper portion (due to macroblocks being encoded with a low QP) and a low quality lower portion (due to the latter macroblocks being encoded with a high QP).

There is no visual quality benefit from an increased bit allocation and high PSNR beyond a certain point (e.g., 40 dB for the PSNR), especially in case of still frames. In other words, once a still frame reaches a particular PSNR, allocating additional bits to further increase the PSNR will not result in a visible quality improvement in the still frame. Conversely, for frames capturing motion, a gain in PSNR due to an increased bit allocation will result in a perceptible quality increase as the PSNR of motion frames is typically lower than that of still frames. Accordingly, it is advantageous to identify still frames during video encoded so as to control the allocation of bits for subsequently encoded frames, especially in single pass video encoding applications. Additional advantages are also provided by identifying still frames in video data. For example, where some analysis needs to be performed on the video data (e.g., an analysis of security or surveillance footage), removal or skipping of the identified still frames improves the efficiency of analysis by reducing the number of frames to be analyzed.

Still frame detection in video data in accordance with the present application is generally implemented with computers, that is, with automated computing machinery. For further explanation, therefore, FIG. 1 sets forth a block diagram of computing machinery including an exemplary computer 100 configured for still frame detection in video data according to certain embodiments. The exemplary computer 100, as well as the approaches set forth herein, may be used in a variety of devices or scenarios, including personal computers, security equipment, video cameras, mobile devices, gaming devices, set-top-boxes, and the like. The computer 100 of FIG. 1 includes at least one computer processor 102 or 'CPU' as well as random access memory 104 ('RAM') which is connected through a high speed memory bus 106 and bus adapter 108 to processor 102 and to other components of the computer 100.

Stored in RAM 104 is an operating system 110. Operating systems useful in computers configured for still frame detection in video data according to certain embodiments include UNIX™, Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the encoding module 114 a module for still frame detection in video data according to certain embodiments.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for still frame detection in video data according to certain embodiments include Integrated Drive Electronics ('IDE') adapters, Small Computer System Interface (SCSI) adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for still frame detection in video data according to certain embodiments include modems for wired dial-up communications, Ethernet (IEEE 802.3) adapters for wired data communications, and 802.11 adapters for wireless data communications.

To perform still frame detection in video data, the computer 100 (e.g., the encoding module 114) encodes a frame of video data. The frame of video data is encoded according to some previously determined allocation of bits and quantization parameters. In some embodiments, the frame is encoded as an interframe referencing one or more previously encoded frames. To begin determining if the frame is a still frame, the encoding module 114 determines if an average QP of the frame is lower than a QP threshold. For example, assume that the frame is encoded as a plurality of macroblocks, each macroblock including a contiguous portion of pixels of the frame. As described herein, a macroblock is a processing or functional unit of a frame and is not limited or restricted to any particular video standard. Accordingly, steps or processes described herein as being performed with respect to macroblocks may also be performed on other functional or processing units of frames or video coding. Each macroblock is encoded according to a determined QP. Thus, the average QP ($QP_{avg}$) for a frame is the average of all QPs used to encode each macroblocks of the frame. The QP threshold ($QP_{thr}$) is a predefined threshold value. For example, in some embodiments, the QP threshold is selected as a threshold that produces a desired video quality (e.g., a subjectively "good" video quality). For example, the QP threshold is selected as 25 or another value selected according to engineering or design considerations as can be appreciated.

For example, where $QP_{avg} > QP_{thr}$, the frame is not identified as a still frame. Otherwise, where $QP_{avg} <= QP_{thr}$, the encoding module 114 advances to the next step in determining whether the encoded frame is a still frame. Next, the encoding module 114 determines if an amount of skipped macroblocks in the frame ($MB_{skip}$) meets a predefined threshold (e.g., a skipped macroblock threshold ($MB_{skip\_thr}$)). As set forth above, where the frame is encoded as an interframe referencing a previously encoded frame, one or more macroblocks in the frame are encoded as references to one or more corresponding macroblocks of the previous frame. A skipped macroblock (e.g., a SKIP macroblock) is a particular type of interframe macroblock encoding referencing a previously encoded macroblock. For example, the skipped macroblock is encoded by referencing the previously encoded macroblock without coding any residual errors or motion vectors. A decoder of the video data would then deduce the motion vector for the skipped macroblock based on other motion vectors of other decoded macroblocks. An encoder typically encodes a macroblock as a skipped macroblock due to one of two scenarios: either the macroblock to be encoded is identical to its reference, or due to the QP for encoding the macroblock being high and not having enough bits to encode. As the evaluation of whether $MB_{skip} >= MB_{skip\_thr}$ occurs if $QP_{avg} <= QP_{thr}$, the likelihood of the latter scenario is reduced or eliminated.

In some embodiments, the amount of skipped macroblocks in the frame $MB_{skip}$ is defined as a percentage or ratio of skipped macroblocks relative to other macroblocks in the frame. Accordingly, $MB_{skip\_thr}$ is defined as a percentage or ratio threshold. One skilled in the art will appreciate that, in some embodiments, $MB_{skip}$ is expressed according to another approach and $MB_{skip\_thr}$ is defined accordingly. If $MB_{skip}$ meets $MB_{skip\_thr}$ (e.g., $MB_{skip} >= MB_{skip\_thr}$), the encoding module 114 identifies the frame as a still frame.

If $MB_{skip}$ fails to meet $MB_{skip\_thr}$ (e.g., $MB_{skip} < MB_{skip\_thr}$), there is still a possibility that the frame is a still frame. For example, in some embodiments, the frame is encoded mostly using interframe macroblock encodings other than skipped macroblocks. For example, where the frame is encoded according to a high bitrate, even if the frame is highly similar to the previous frame, an encoder will encode some macroblocks as non-skipped macroblocks due to having a high amount of bits available. Accordingly, if $MB_{skip} < MB_{skip\_thr}$, the encoding module 114 determines if an amount of interframe encoded macroblocks of the frame $MB_{inter}$ meets an interframe macroblock threshold $MB_{inter\_thr}$. In some embodiments, the amount of interframe encoded macroblocks of the frame $MB_{inter}$ is defined as a percentage or ratio of interframe encoded macroblocks relative to other macroblocks in the frame. Accordingly, $MB_{inter\_thr}$ is defined as a percentage or ratio threshold. One skilled in the art will appreciate that, in some embodiments, $MB_{inter}$ is expressed according to another approach and $MB_{inter\_thr}$ defined thr is accordingly.

If $MB_{inter}$ falls below $MB_{inter\_thr}$ (e.g., $MB_{inter} < MB_{inter\_thr}$), the encoding module 114 identifies the frame as a non-still frame. Otherwise, if $MB_{inter} >= MB_{inter\_}$ thr, the encoding module 114 compares the rate-distortion cost (RDCost) of non-skipped macroblocks with the RDCost of skipped macroblocks to determine RD-$Ratio_{non\text{-}skip}$. For example, the encoding module 114 calculates the total RDCost of skipped macroblocks in the frame ($RDCostSkip_{frame}$) and the total RDCost of all interframe macroblocks (including skipped and non-skipped interframe macroblocks) in the frame ($RDCostInter_{frame}$). The encoding module 114 calculates the average RDCost for a skipped macroblock ($RDCostSkip_{MB}$) as $RDCostSkip_{frame}$/Num_Skip_MB, where Num_Skip_MB is the number of skipped macroblocks in the frame. The encoding module 114 also calculates the average RDCost for a non-skipped interframe macroblock ($RDCostNonSkip_{MB}$) as ($RDCostInter_{frame}$ − $RDCostSkip_{frame}$)/(Picture_size_in_MBs−Num_Skip_MB), where Picture_size_in_MBs is the total number of macroblocks in the frame. The ratio $RDRatio_{non\text{-}skip}$ is then calculated as ($RDCostNonSkip_{MB}$−$RDCostSkip_{MB}$)/($RDCostNonSkip_{MB}$). The encoding module 114 then compares the ratio $RDRatio_{non\text{-}skip}$ to a threshold $RDRatio_{non\text{-}skip\_thr}$. If $RDRatio_{non\text{-}skip}$ falls below the threshold (e.g., $RDRatio_{non\text{-}skip} < RDRatio_{non\text{-}skip\_thr}$), the frame is identified as a still frame.

In some embodiments, the encoding module 114 takes one or more actions in response to identifying the frame as a still frame. For example, in some embodiments like single pass video encoding, the encoding module 114 modifies one or more encoding attributes of a next frame to be encoded (e.g., a frame occurring sequentially after the frame identified as a still frame). As an example, a QP for encoding the next frame or at least a portion of the next frame (e.g., one or more macroblocks of the next frame) are modified. In some embodiments, modifying the QP includes increasing the QP or preventing a reduction in the QP as determined by a rate control algorithm. Thus, fewer bits will be used for the next frame. Where a series of frames are identified as still frames, the reduced allocation of bits for this series of frames allows later encoded motion frames to have additional bits allocated, allowing for increased quality in the motion frames while maintaining a target bit rate.

As another example of an action taken by the encoding module 114 in response to identifying a still frame, in some embodiments, the encoding module 114 generates data indicating a still frame. For example, a tag or other metadata for the video data indicates the frame is a still frame. The data indicating the frame, and potentially other frames, as still frames, facilitates various operations by the encoding module 114 or another service as can be appreciated. For example, in some embodiments, one or more identified still frames are skipped in the video data. Thus, when performing a manual or computer-assisted analysis of the video data, the total amount of video to be analyzed is reduced. For example, assuming that the video data includes security footage, bypassing of the still frames assists in reviewing the security footage as the still frames will likely not contain any important information.

According to the approach described above, various comparisons will result in the frame being identified as a still frame. Accordingly, such comparisons will also result in the frame being identified as a non-still frame (e.g., a motion frame) where the comparisons generate the opposite result. For example, where $QP_{avg} > QP_{thr}$, the frame is not identified as a still frame. As another example, where $QP_{avg} <= QP_{thr}$, but $MB_{skip} < MB_{skip\_thr}$, and MB inter<$MB_{inter\_thr}$ the frame is not identified as a still frame. As a further example, where $QP_{avg} <= QP_{thr}$ and $MB_{skip} < MB_{skip\_thr}$, and $MB_{inter} >= MB_{inter\_thr}$ but $RDRatio_{non-skip} >= RDRatio_{non-skip\_thr}$, the frame is not identified as a still frame. Where the frame is not identified as a still frame, in some embodiments, the encoding module 114 allows a rate control algorithm to modify the QP of the next frame, as necessary. One skilled in the art will appreciate that the particular modifications to QP or other encoding attributes will vary according to the particular rate control algorithm being implemented.

For further explanation, FIG. 2 sets forth a flow chart illustrating an exemplary method for still frame detection in video data that includes determining 202 (e.g., by an encoding module 114) that an average quantization parameter of a frame of video data falls below a quantization parameter threshold. In some embodiments, the frame is encoded as an interframe referencing one or more previously encoded frames. Assume that the frame is encoded as a plurality of macroblocks, each macroblock including a contiguous portion of pixels of the frame. Each macroblock is encoded according to a determined QP. Thus, the average QP ($QP_{avg}$) for a frame is the average of all QPs used to encode each macroblocks of the frame. The QP threshold ($QP_{thr}$) is a predefined threshold value. For example, in some embodiments, the QP threshold is selected as a threshold that produces a desired video quality (e.g., a subjectively "good" video quality). For example, the QP threshold is selected as 25 or another value selected according to engineering or design considerations as can be appreciated.

Figure 2:
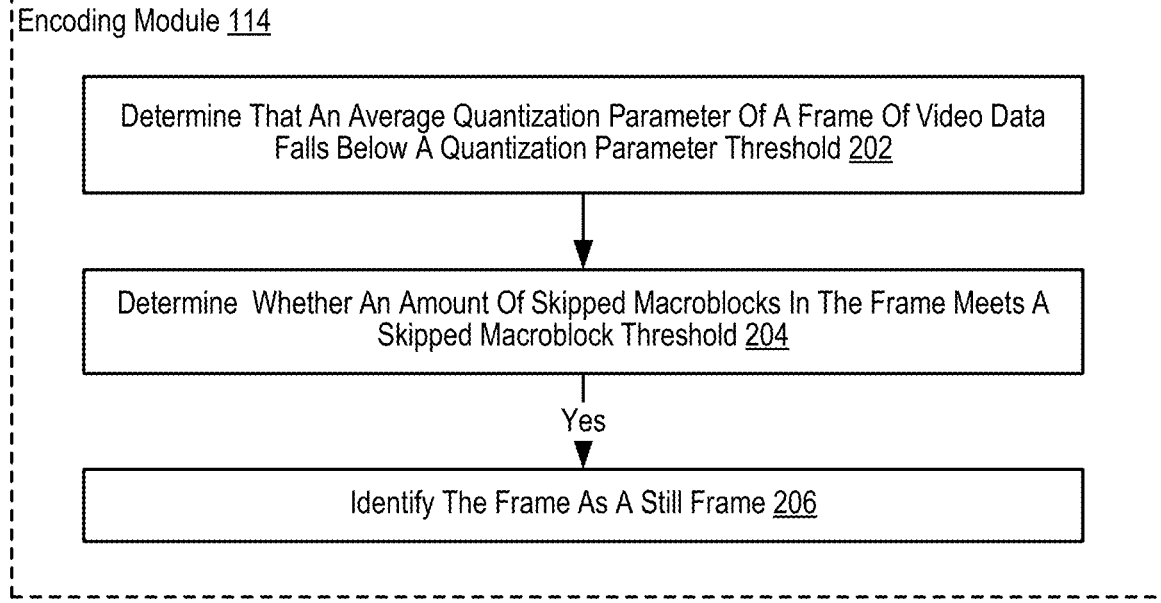
FIG. 2 is a flowchart of an example method for still frame detection in video data according to some embodiments.

The method of FIG. 2 also includes determining 204 (e.g., by the encoding module 204) if an amount of skipped macroblocks in the frame ($MB_{skip}$) meets a skipped macroblock threshold ($MB_{skip\_thr}$). As set forth above, where the frame is encoded as an interframe referencing a previously encoded frame, one or more macroblocks in the frame are encoded as references to one or more corresponding macroblocks of the previous frame. A skipped macroblock (e.g., a SKIP macroblock) is a particular type of interframe macroblock encoding referencing a previously encoded macroblock. For example, the skipped macroblock is encoded by referencing the previously encoded macroblock without coding any residual errors or motion vectors. In some embodiments, the amount of skipped macroblocks in the frame $MB_{skip}$ is defined as a percentage or ratio of skipped macroblocks relative to other macroblocks in the frame. Accordingly, $MB_{skip\_thr}$ is defined as a percentage or ratio threshold. One skilled in the art will appreciate that, in some embodiments, $MB_{skip}$ is expressed according to another approach and $MB_{skip\_thr}$ is defined accordingly. If the amount of skipped macroblocks in the frame meets the skipped macroblock threshold, the method of FIG. 2 proceeds to identifying 206 (e.g., by the encoding module 114) the frame as a still frame. In other words, if $MB_{skip}$ meets $MB_{skip\_thr}$ (e.g., MB skip>=$MB_{skip\_thr}$), the encoding module 114 identifies the frame as a still frame.

For further explanation, FIG. 3 sets forth a flow chart illustrating an exemplary method for still frame detection in video data that includes determining 202 (e.g., by an encoding module 114) that an average quantization parameter of a frame of video data falls below a quantization parameter threshold; determining 204 (e.g., by the encoding module 204) if an amount of skipped macroblocks in the frame meets a skipped macroblock threshold; and identifying 206 (e.g., by the encoding module 114, in response to the amount of skipped macroblocks in the frame meeting the skipped macroblock threshold) the frame as a still frame.

The method of FIG. 3 differs from FIG. 2 in that, if it is determined 204 that the mount of skipped macroblocks in the frame falls below the skipped macroblock threshold (e.g., if $MB_{skip} < MB_{skip\_thr}$), the method of FIG. 3 advances to determining 302 that an amount of interframe encoded macroblocks of the frame meets an interframe macroblock threshold. In some embodiments, the amount of interframe encoded macroblocks of the frame $MB_{inter}$ is defined as a percentage or ratio of interframe encoded macroblocks relative to other macroblocks in the frame. Accordingly, $MB_{inter\_thr}$ is defined as a percentage or ratio threshold. One skilled in the art will appreciate that, in some embodiments, $MB_{inter}$ is expressed according to another approach and $MB_{inter\_thr}$ is defined accordingly.

The method of FIG. 3 also includes determining 304 (e.g., by the encoding module 114 in response to $MB_{inter} >= MB_{inter\_thr}$) that a rate-distortion cost ratio of skipped macroblocks of the frame relative to non-skipped macroblock of the frame falls below a rate-distortion cost ratio threshold. For example, the encoding module 114 calculates the total RDCost of skipped macroblocks in the frame ($RDCostSkip_{frame}$) and the total RDCost of all interframe macroblocks (including skipped and non-skipped interframe macroblocks) in the frame ($RDCostInter_{frame}$). The encoding module 114 calculates the average RDCost for a skipped macroblock ($RDCostSkip_{MB}$) as $RDCostSkip_{frame}$/Num_Skip_MB, where Num_Skip_MB is the number of skipped macroblocks in the frame. The encoding module 114 also calculates the average RDCost for a non-skipped interframe macroblock ($RDCostNonSkip_{MB}$) as ($RDCostInter_{frame}$–$RDCostSkip_{frame}$)/(Picture_size_in_MBs–Num_Skip_MB), where Picture_size_in_MBs is the total number of macroblocks in the frame. The ratio $RDRatio_{non-skip}$ is then calculated as ($RDCostNonSkip_{MB}$–$RDCostSkip_{MB}$)/$RDCostNonSkip_{MB}$. The encoding module 114 then compares the ratio $RDRatio_{non-skip}$ to a threshold $RDRatio_{non-skip\_thr}$. The method of FIG. 3 also includes responsive to the rate-distortion cost ratio falling below the rate-distortion cost threshold (e.g., $RDRatio_{non-skip} < RDRatio_{non-skip\_thr}$), identifying 306 (e.g., by the encoding module 114) the frame as a still frame.

For further explanation, FIG. 4 sets forth a flow chart illustrating an exemplary method for still frame detection in video data that includes determining 202 (e.g., by an encoding module 114) that an average quantization parameter of a frame of video data falls below a quantization parameter threshold; determining 204 (e.g., by the encoding module 204) if an amount of skipped macroblocks in the frame meets a skipped macroblock threshold; and identifying 206 (e.g., by the encoding module 114, in response to the amount of skipped macroblocks in the frame meeting the skipped macroblock threshold) the frame as a still frame.

Figure 4:
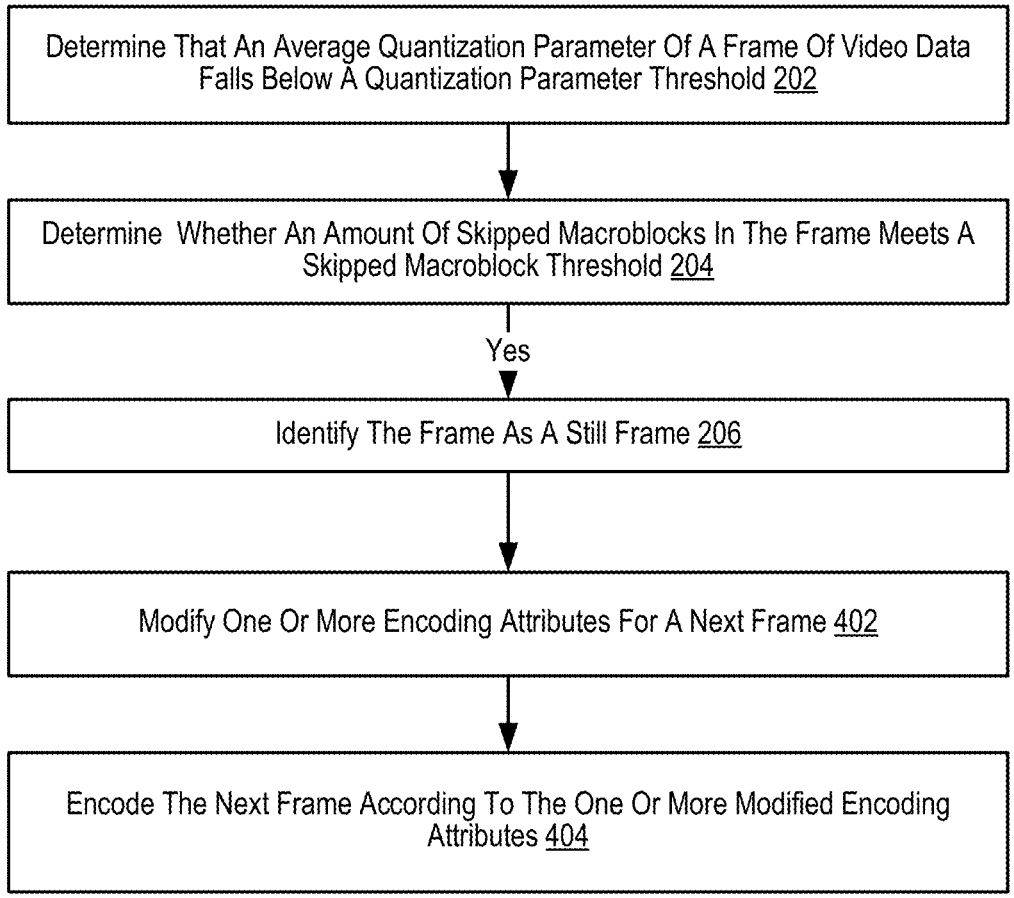
FIG. 4 is a flowchart of an example method for still frame detection in video data according to some embodiments.

The method of FIG. 4 differs from FIG. 2 in that the method of FIG. 4 includes modifying 402 one or more encoding attributes for a next frame. As an example, a QP for encoding the next frame or at least a portion of the next frame (e.g., one or more macroblocks of the next frame) are modified. In some embodiments, modifying the QP includes increasing the QP or preventing a reduction in the QP as determined by a rate control algorithm. Thus, fewer bits will be used for the next frame. Where a series of frames are identified as still frames, the reduced allocation of bits for this series of frames allows later encoded motion frames to have additional bits allocated, allowing for increased quality in the motion frames while maintaining a target bit rate. The method of FIG. 4 also includes encoding 404 the next frame according to the one or more modified encoding attributes.

For further explanation, FIG. 5 sets forth a flow chart illustrating an exemplary method for still frame detection in video data that includes determining 202 (e.g., by an encoding module 114) that an average quantization parameter of a frame of video data falls below a quantization parameter threshold; determining 204 (e.g., by the encoding module 204) if an amount of skipped macroblocks in the frame meets a skipped macroblock threshold; and identifying 206 (e.g., by the encoding module 114, in response to the amount of skipped macroblocks in the frame meeting the skipped macroblock threshold) the frame as a still frame.

Figure 5:
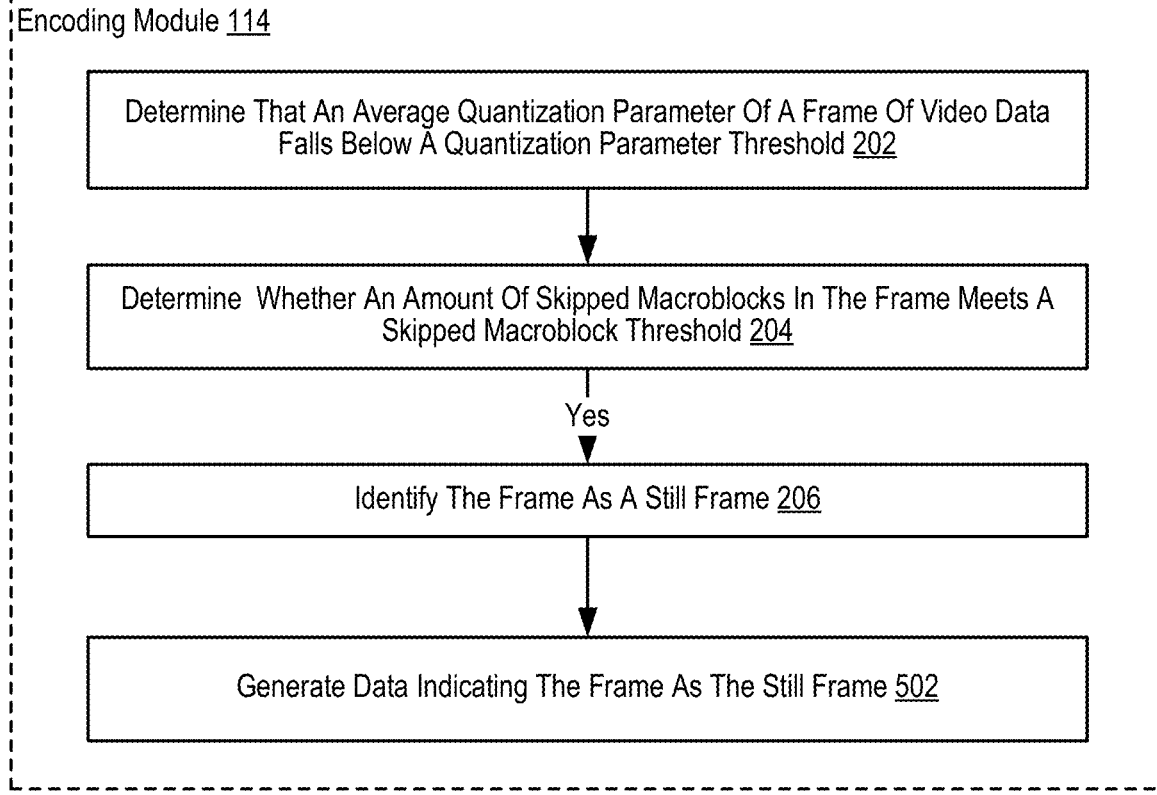
FIG. 5 is a flowchart of an example method for still frame detection in video data according to some embodiments.

The method of FIG. 5 differs from FIG. 2 in that the method of FIG. 5 includes generating 502 data indicating the frame as a still frame. For example, the encoding module 114 generates a tag or other metadata for the video data indicates the frame is a still frame. As additional frames are encoded and potentially identified as still frames, the encoding module 114 thus generates data for the video data indicating one or more identified still frames.

For further explanation, FIG. 6 sets forth a flow chart illustrating an exemplary method for still frame detection in video data that includes determining 202 (e.g., by an encoding module 114) that an average quantization parameter of a frame of video data falls below a quantization parameter threshold; determining 204 (e.g., by the encoding module 204) if an amount of skipped macroblocks in the frame meets a skipped macroblock threshold; identifying 206 (e.g., by the encoding module 114, in response to the amount of skipped macroblocks in the frame meeting the skipped macroblock threshold) the frame as a still frame; and generating 502 data indicating the frame as the still frame.

Figure 6:
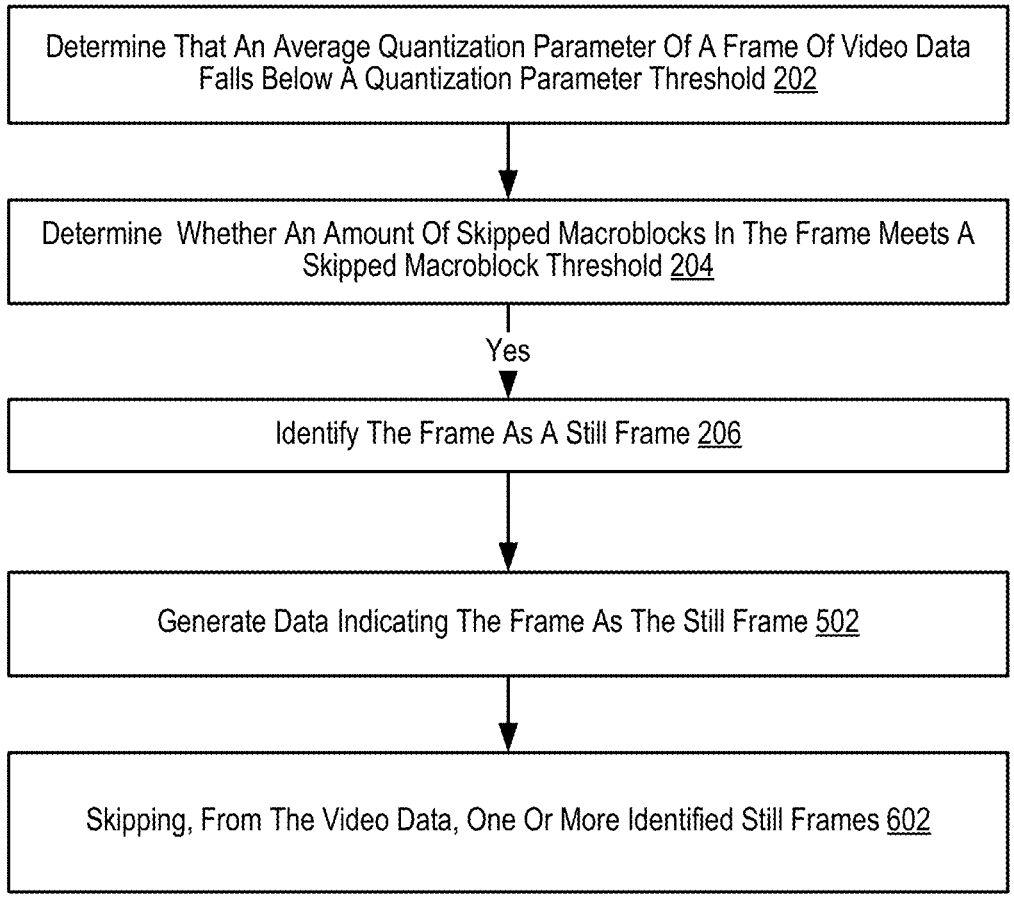
FIG. 6 is a flowchart of an example method for still frame detection in video data according to some embodiments.

The method of FIG. 6 differs from FIG. 5 in that the method of FIG. 6 includes skipping 602, from the video data, one or more identified still frames. For example, the encoding module 114 or another module as can be appreciated accesses the generated data indicating still frames in the video data. The identified still frames are then skipped (e.g., bypassed) from the video data. Thus, as still frames are less likely to include information relevant to a manual or machine-assisted analysis of the data, the total amount of video data to be analyzed is reduced.

Figure 7:
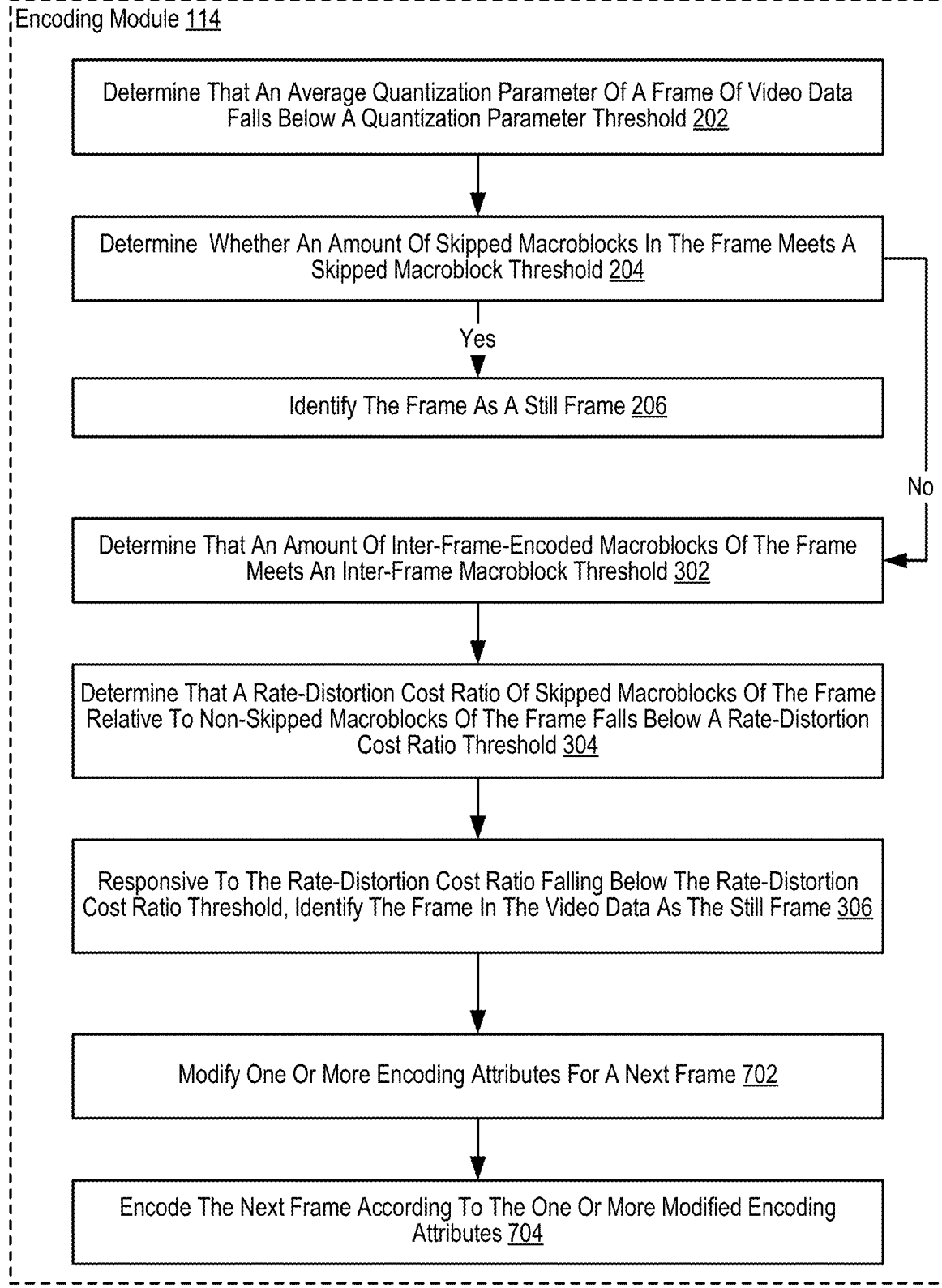
FIG. 7 is a flowchart of an example method for still frame detection in video data according to some embodiments.

For further explanation, FIG. 7 sets forth a flow chart illustrating an exemplary method for still frame detection in video data. FIG. 7 is similar to FIG. 3 in that FIG. 7 includes determining 202 (e.g., by an encoding module 114) that an average quantization parameter of a frame of video data falls below a quantization parameter threshold; determining 204 (e.g., by the encoding module 204) if an amount of skipped macroblocks in the frame meets a skipped macroblock threshold; and identifying 206 (e.g., by the encoding module 114, in response to the amount of skipped macroblocks in the frame meeting the skipped macroblock threshold) the frame as a still frame; responsive to the amount of skipped macroblocks in the frame falling below a skipped macroblock threshold, determining 302 that an amount of inter-frame-encoded macroblocks of the frame meets an inter-frame macroblock threshold; determining 304 that a rate-distortion cost ratio of skipped macroblocks of the frame relative to non-skipped macroblocks of the frame falls below a rate-distortion cost ratio threshold; and responsive to the rate-distortion cost ratio falling below the rate-distortion cost ratio threshold, identifying 306 the frame in the video data as the still frame.

Figure 3:
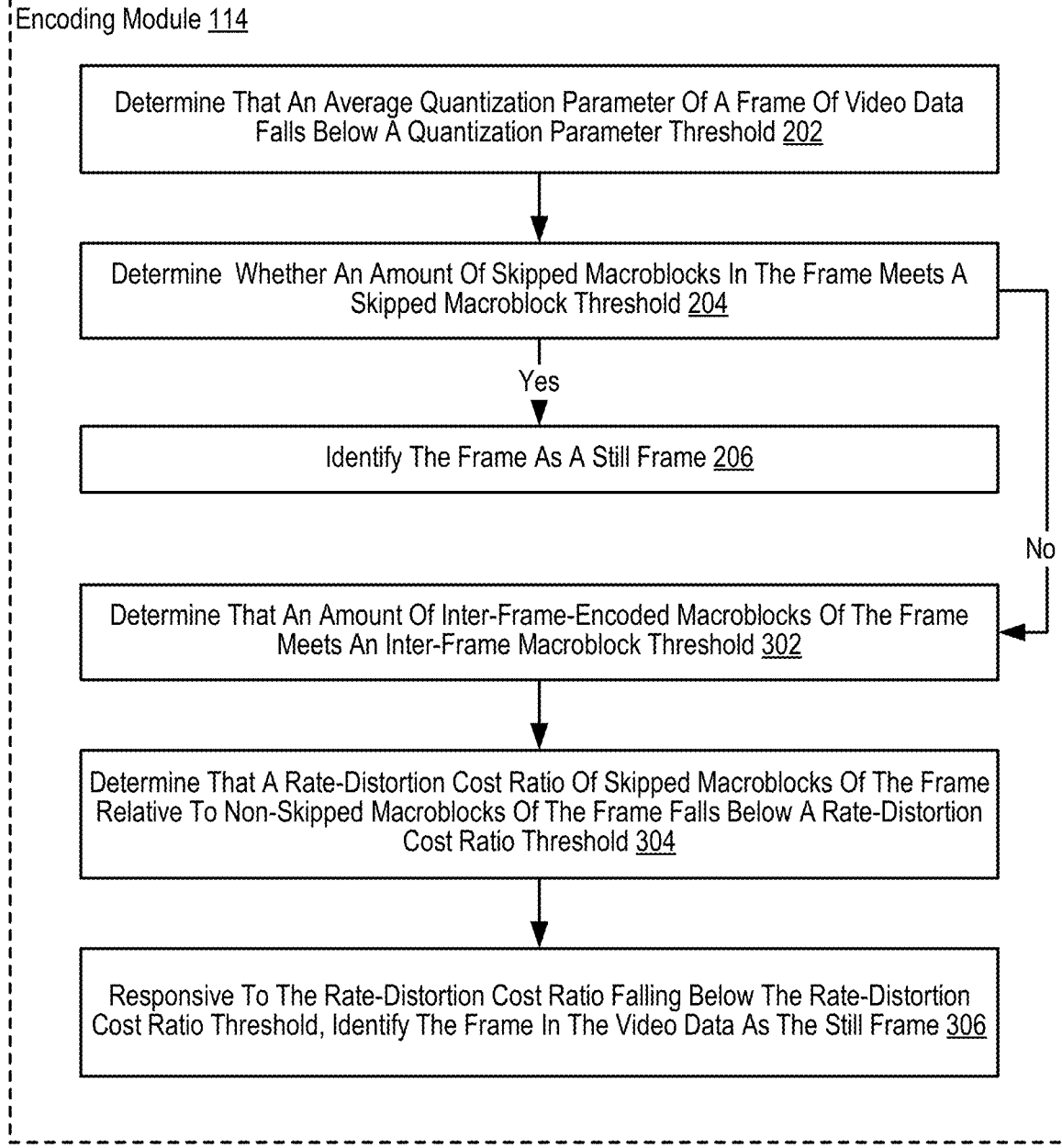
FIG. 3 is a flowchart of an example method for still frame detection in video data according to some embodiments.

The method of FIG. 7 differs from FIG. 3 in that the method of FIG. 7 includes modifying 702 one or more encoding attributes for a next frame. As an example, a QP for encoding the next frame or at least a portion of the next frame (e.g., one or more macroblocks of the next frame) are modified. In some embodiments, modifying the QP includes increasing the QP or preventing a reduction in the QP as determined by a rate control algorithm. Thus, fewer bits will be used for the next frame. Where a series of frames are identified as still frames, the reduced allocation of bits for this series of frames allows later encoded motion frames to have additional bits allocated, allowing for increased quality in the motion frames while maintaining a target bit rate. The method of FIG. 7 also includes encoding 704 the next frame according to the one or more modified encoding attributes.

In view of the explanations set forth above, readers will recognize that the benefits of still frame detection in video data include:

Improved performance of a computing system by modifying encoding of frames based on identified still frames, thereby maintaining or improving overall video quality by increasing the amount of bits allocated for non-still, motion frames.

Improved performance of a computing system by increased computational efficiency in analyzing video data by skipping identified still frames.

Exemplary embodiments of the present disclosure are described largely in the context of a fully functional computer system for still frame detection in video data. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of still frame detection in video data, the method comprising:
    determining that an average quantization parameter of a frame of video data falls below a quantization parameter threshold;
    determining, in response to the average quantization parameter falling below the quantization parameter threshold, whether an amount of skipped macroblocks in the frame meets a skipped macroblock threshold; and
    responsive to the amount of skipped macroblocks exceeding the skipped macroblock threshold, identifying the frame as a still frame.

2. The method of claim 1, further comprising:
responsive to the amount of skipped macroblocks falling below the skipped macroblock threshold, determining that an amount of interframe-encoded macroblocks of the frame meets an interframe macroblock threshold;
determining that a rate-distortion cost ratio of skipped macroblocks of the frame relative to non-skipped macroblocks of the frame falls below a rate-distortion cost ratio threshold; and
responsive to the rate-distortion cost ratio falling below the rate-distortion cost ratio threshold, identifying the frame as the still frame.

3. The method of claim 1, further comprising:
modifying, in response to the frame being identified as the still frame, one or more encoding attributes for a next frame; and
encoding the next frame according to the one or more modified encoding attributes.

4. The method of claim 1, further comprising generating data indicating the frame as the still frame.

5. The method of claim 4, further comprising skipping, based on the data, one or more identified still frames during an analysis of the video data.

6. The method of claim 1, wherein the video data comprises single pass video data.

7. The method of claim 1, wherein the average quantization parameter comprises an average of each quantization parameter used to encode each macroblock of the frame.

8. An apparatus for still frame detection in video data, the apparatus comprising:
a processor; and
memory, the memory including instructions that, when executed by the processor, cause the apparatus to:
determine that an average quantization parameter of a frame of video data falls below a quantization parameter threshold;
determine, in response to the average quantization parameter falling below the quantization parameter threshold, whether an amount of skipped macroblocks in the frame meets a skipped macroblock threshold; and
responsive to the amount of skipped macroblocks exceeding the skipped macroblock threshold, identify the frame as a still frame.

9. The apparatus of claim 8, wherein the instructions further cause the apparatus to:
responsive to the amount of skipped macroblocks falling below the skipped macroblock threshold, determine that an amount of interframe-encoded macroblocks of the frame meets an interframe macroblock threshold;
determine that a rate-distortion cost ratio of skipped macroblocks of the frame relative to non-skipped macroblocks of the frame falls below a rate-distortion cost ratio threshold; and
responsive to the rate-distortion cost ratio falling below the rate-distortion cost ratio threshold, identify the frame as the still frame.

10. The apparatus of claim 8, wherein the instructions further cause the apparatus to:
modify, in response to the frame being identified as the still frame, one or more encoding attributes for a next frame; and
encode the next frame according to the one or more modified encoding attributes.

11. The apparatus of claim 8, wherein the instructions further cause the apparatus to generate data indicating the frame as the still frame.

12. The apparatus of claim 11, wherein the instructions further cause the apparatus to skip, based on the data, one or more identified still frames during an analysis of the video data.

13. The apparatus of claim 8, wherein the video data comprises single pass video data.

14. The apparatus of claim 8, wherein the average quantization parameter comprises an average of each quantization parameter used to encode each macroblock of the frame.

15. A computer program product disposed upon a non-transitory computer readable medium, the computer program product comprising computer program instructions for still frame detection in video data that, when executed, cause a computer system to perform steps comprising:
determining that an average quantization parameter of a frame of video data falls below a quantization parameter threshold;
determining, in response to the average quantization parameter falling below the quantization parameter threshold, whether an amount of skipped macroblocks in the frame meets a skipped macroblock threshold; and
responsive to the amount of skipped macroblocks exceeding the skipped macroblock threshold, identifying the frame as a still frame.

16. The computer program product of claim 15, wherein the steps further comprise:
responsive to the amount of skipped macroblocks falling below the skipped macroblock threshold, determining that an amount of interframe-encoded macroblocks of the frame meets an interframe macroblock threshold;
determining that a rate-distortion cost ratio of skipped macroblocks of the frame relative to non-skipped macroblocks of the frame falls below a rate-distortion cost ratio threshold; and
responsive to the rate-distortion cost ratio falling below the rate-distortion cost ratio threshold, identifying the frame as the still frame.

17. The computer program product of claim 15, wherein the steps further comprise:
modifying, in response to the frame being identified as a still frame, one or more encoding attributes for a next frame; and
encoding the next frame according to the one or more modified encoding attributes.

18. The computer program product of claim 15, wherein the steps further comprise generating data indicating the frame as the still frame.

19. The computer program product of claim 18, further comprising skipping, based on the data, one or more identified still frames during an analysis of the video data.

20. The computer program product of claim 15, wherein the video data comprises single pass video data.

* * * * *